United States Patent
Horie et al.

(10) Patent No.: US 7,959,493 B2
(45) Date of Patent: Jun. 14, 2011

(54) METHOD FOR POLISHING GLASS SUBSTRATE AND PROCESS FOR PRODUCING GLASS SUBSTRATE

(75) Inventors: Mitsuru Horie, Tokyo (JP); Hiroyuki Tomonaga, Tokyo (JP); Masabumi Ito, Tokyo (JP); Noriaki Shimodaira, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/609,247

(22) Filed: Oct. 30, 2009

(65) Prior Publication Data
US 2010/0048375 A1   Feb. 25, 2010

Related U.S. Application Data

(63) Continuation of application No. PCT/JP2009/061245, filed on Jun. 19, 2009.

(30) Foreign Application Priority Data

Jul. 3, 2008   (JP) .................................. 2008-174551

(51) Int. Cl.
 *B24B 1/00*  (2006.01)
(52) U.S. Cl. ............... 451/36; 451/37; 451/41; 451/57; 451/59; 451/60; 451/63
(58) Field of Classification Search .............. 451/36, 451/37, 41, 57, 59, 60, 63, 194, 211, 262–269
See application file for complete search history.

(56) References Cited

U.S. PATENT DOCUMENTS

| | | | | |
|---|---|---|---|---|
| 5,873,772 A | * | 2/1999 | Hajime et al. | 451/41 |
| 5,958,794 A | * | 9/1999 | Bruxvoort et al. | 438/692 |
| 6,676,496 B2 | * | 1/2004 | Yasui et al. | 451/285 |
| 2005/0115908 A1 | * | 6/2005 | Umezawa et al. | 210/717 |
| 2006/0270235 A1 | * | 11/2006 | Siddiqui et al. | 438/692 |
| 2007/0251270 A1 | | 11/2007 | Miyatani et al. | |
| 2009/0275268 A1 | * | 11/2009 | Ishida et al. | 451/41 |
| 2009/0308836 A1 | * | 12/2009 | Siddiqui et al. | 216/13 |
| 2010/0086864 A1 | * | 4/2010 | Kojima et al. | 430/5 |

FOREIGN PATENT DOCUMENTS

| | | |
|---|---|---|
| JP | 8-319111 | 12/1996 |
| JP | 10-194789 | 7/1998 |
| JP | 2000-76645 | 3/2000 |
| JP | 2000-094280 | 4/2000 |
| JP | 2000-163740 | 6/2000 |
| JP | 2006-265018 | 10/2006 |
| WO | 2008-035586 | 3/2008 |

* cited by examiner

*Primary Examiner* — Timothy V Eley
(74) *Attorney, Agent, or Firm* — Oblon, Spivak, McClelland, Maier & Neustadt, L.L.P.

(57) ABSTRACT

Spots generated on a glass substrate after a polishing step are reduced. The present invention relates to a method for polishing a glass substrate including injecting a silica abrasive and a high-boiling solvent in a final glass substrate polishing step. The high-boiling solvent is preferably a solvent having a molecular weight of 300 or lower and a boiling point of 150° C. or higher. As Examples of the high-boiling solvent having a molecular weight of 300 or lower and a boiling point of 150° C. or higher includes ethylene glycol, propylene glycol and glycerine.

9 Claims, 8 Drawing Sheets

*Fig. 6*

| POLISHING CONDITIONS | FREQUENCY OF DAMAGE GENERATION (damages/disk) |
|---|---|
| CERIUM OXIDE | 0 |
| COLLOIDAL SILICA | 1,020 |

*Fig. 7*

| POLISHING CONDITIONS | FREQUENCY OF DAMAGE GENERATION |
|---|---|
| NO GLYCERINE ADDED | 8.6% (3,001 SUBSTRATES / 34,905 SUBSTRATES) |
| 0.8 wt% GLYCERINE ADDED | 2.2% (308 SUBSTRATES / 14,019 SUBSTRATES) |
| 2.9 wt% GLYCERINE ADDED | 2.7% (3,026 SUBSTRATES / 112,080 SUBSTRATES) |

*Fig. 8*

| EXAMINATION CONDITIONS | COEFFICIENT OF FRICTION |
|---|---|
| NO ADDITIVE ADDED | 0.15 |
| 2.9 wt% GLYCERINE ADDED | 0.12 |
| 2.9 wt% ETHYLENE GLYCERINE ADDED | 0.12 |

| POLISHING CONDITIONS | POLISHING RATE ( / min / one side) |
|---|---|
| NO ADDITIVE ADDED | 32 nm |
| 2.9 wt% GLYCERINE ADDED | 32 nm |
| 5 wt% GLYCERINE ADDED | 18 nm |
| 10 wt% GLYCERINE ADDED | 13 nm |

METHOD FOR POLISHING GLASS SUBSTRATE AND PROCESS FOR PRODUCING GLASS SUBSTRATE

TECHNICAL FIELD

The present invention relates to a method for polishing a glass substrate and process for producing a glass substrate.

BACKGROUND ART

In recent years, glass substrates are used in various industrial fields besides conventional applications. In the field of various electronic devices, for example, glass substrates suitable for respective applications are used.

For example, personal computers (PC) or the like are provided with a hard disk drive (HDD) or the like as an external storage device. In general, the hard disk drive has mounted thereon a magnetic disk which is known as a storage for computer or the like. The magnetic disk has a configuration in which a magnetic layer or the like is formed on an appropriate substrate, for example, an aluminum based alloy substrate.

In recent years, glass substrates which are materials having high strength and high rigidity have been frequently used in place of rigid brittle metal substrates. Further, the glass substrates have attracted attention as substrates for magnetic disks for a server application.

Furthermore, with a progress of growing memory capacity of hard disks, in order to increase memory density, to improve record reading accuracy, and the like, higher-accuracy flatness has been demanded for the glass substrates for magnetic disks, and particularly, it has been demanded that microwaviness largely affecting floating performance of magnetic heads is more decreased.

As a polishing machine for producing such glass substrates, patent document 1 discloses a double-sided polishing machine as shown in FIG. 10. This double-sided polishing machine 100 has a polishing carrier mounting unit having an internal gear 101 and a sun gear 102 which are each driven for rotation at a predetermined rotation ratio, and an upper surface plate 103 and a lower surface plate 104 which are driven for rotation reversely to each other with this polishing carrier mounting unit therebetween. Polishing pads 106 are each mounted on faces of the upper surface plate 103 and the lower surface plate 104 facing to glass substrates 105. Polishing carriers 107 mounted so as to be meshing engagement with the internal gear 101 and the sun gear 102 perform a planetary gear movement. In this planetary gear movement, the polishing carrier 107 moves while rotating on a center of itself as its axis and moving around the sun gear 102 as an axis. Both faces of the glass substrate 105 are concurrently polished with friction between the polishing pads 106 and the glass substrate 105 caused by this planetary gear movement. In this double-sided polishing machine 100, it is necessary to move up the upper surface plate 103, in order to take out the polished glass substrate 105 after the glass substrate 105 have been polished.

In polishing machine such as that described above, glass substrates are polished while supplying a predetermined abrasive to the polishing pads. As such abrasives for glass substrates, for example, ceria particle (cerium oxide particle) abrasives and silica particle (silicon dioxide particle) abrasives are known.

Glass substrates for use in electronic devices and the like, such as the glass substrates for magnetic disks described above, are required to have high precision and high quality, and there is severe competition in development. Patent documents 1 to 3 disclose a process for producing such a glass substrate or a method of polishing for producing the substrate.
Patent Document 1: JP-A-2008-103061
Patent Document 2: JP-A-2006-265018
Patent Document 3: JP-A-2000-163740

PROBLEMS THAT THE INVENTION IS TO SOLVE

In glass substrate polishing methods such as that described in patent document 1, the operation unavoidably involves a time period ranging from the completion of polishing in the polishing machine to the introduction of the glass substrates into a next step (interval between steps). In this interval between steps, drying spots C caused by the abrasive generate on the surfaces of the glass substrate 50 as shown in FIG. 11. These drying spots C are causative of recording head crushing in the case of glass substrates for magnetic disks, and are causative of the occurrence of exposure defects in the case of photomask substrates for semiconductor production. Such situation is an especially serious problem in glass substrates for use in electronic devices and the like.

Patent document 2 and patent document 3 describe adding a predetermined ingredient to an abrasive in order to heighten the precision of polishing. However, these documents are not intended to eliminate the generation of spots such as that described above.

Under these circumstances, the invention provides a method for polishing a glass substrate, which employs a silica abrasive and which can reduce spot generation on glass substrates after a polishing step while maintaining polishing efficiency and thereby heightening the quality of the glass substrates as a final product.

MEANS FOR SOLVING THE PROBLEMS

The present invention relates to a method for polishing a glass substrate which comprises polishing the glass substrate with a glass substrate polishing machine, the method including a step of injecting a silica abrasive and a high-boiling solvent having a boiling point of 150° C. or higher (hereinafter often referred to simply as a high-boiling solvent) into the glass substrate polishing machine in a final glass substrate polishing step. Incidentally, the term "final glass substrate polishing step" means the polishing step which is the final of one or more polishing steps to be conducted on the glass substrate polishing machine. Consequently, the glass substrate taken out from the glass substrate polishing machine after the final polishing step is transferred to other steps, e.g., a cleaning step, and is never subjected to a further polishing step.

In the step of injecting a silica abrasive and a high-boiling solvent into the glass substrate polishing machine, a mixture of the silica abrasive and the high-boiling solvent may be injected or the silica abrasive and the high-boiling solvent may be injected without being mixed together.

The present inventors have found that the spot generation can be reduced or prevented by using a polishing slurry prepared by incorporating a high-boiling solvent into a silica abrasive. The invention has been thus achieved.

There are cases where inclusion of a foreign substance into a polishing slurry results in the damages of glass substrates during a polishing step. The inventors have found that the generation of such damages can be reduced or prevented by using a polishing slurry prepared by incorporating a high-boiling solvent into a silica abrasive.

The invention includes: a process for glass substrate production using the method for polishing a glass substrate of the invention; and a glass substrate or a glass substrate for magnetic disk each produced using the production process.

ADVANTAGES OF THE INVENTION

According to the invention, spot generation on a glass substrate after a polishing step is reduced. It is, therefore, possible to heighten the quality of the glass substrate as a final product without adversely influencing the steps to be conducted after completion of the polishing.

Incidentally, in the case where silica particles such as colloidal silica are used as an abrasive, the spots left after the polishing step are difficult to remove as compared with spots formed from ceria particle abrasives. The reasons for this are as follows. The glass substrates for use in magnetic disks or the like are mainly constituted of silicon dioxide, and the spots constituted of silica particles, e.g., colloidal silica, are likewise constituted of silicon dioxide. It is therefore difficult to remove only these spots by a chemical removing technique such as, e.g., wet etching separately from the glass substrate. On the other hand, the cerium oxide employed in ceria particle abrasives does not contain silicon dioxide and, hence, the ceria abrasives are free from that problem. Furthermore, the cerium oxide particles generally have an average particle diameter of about 0.5 to 2 µm, whereas the silica particles such as colloidal silica have a small size with an average particle diameter of generally about 0.005 to 0.3 µm. Because of this, the spots caused by silica particles are difficult to eliminate even by physical removal such as, e.g., wiping with a sponge. Consequently, when silica particles such as colloidal silica are used as an abrasive as in the invention, it is especially useful to diminish spots by using a high-boiling solvent in the final polishing step.

In addition, in the case where silica particles such as colloidal silica are used as an abrasive, inclusion of a foreign substance into the abrasive is apt to result in damages through the polishing step as compared with ceria particle abrasives. However, by using a high-boiling solvent in the final polishing step, the damages can be effectively reduced. Consequently, the addition of a high-boiling solvent is especially useful when silica particles such as colloidal silica are used as an abrasive.

BRIEF DESCRIPTION OF THE DRAWINGS

FIG. 5(a) is a photograph of the substrate obtained in the case where the abrasive was a cerium oxide particle abrasive; FIG. 5(b) is a photograph of the substrate obtained in the case where the abrasive contained colloidal silica.

FIG. 6 is a table showing the results of an investigation on the frequency of damage generation (number of damages) in the case where the abrasive was a cerium oxide particle abrasive and in the case where the abrasive contained colloidal silica.

FIG. 7 is a table showing the results of a comparison in the frequency of damage generation between the case where glycerine was added to a colloidal silica slurry and the case where glycerine was not added thereto.

FIG. 8 is a table showing the results of a comparison in frictional resistance between the case where glycerine or ethylene glycol was added to an abrasive containing colloidal silica and the case where neither glycerine nor ethylene glycol was added thereto.

Figure 1:
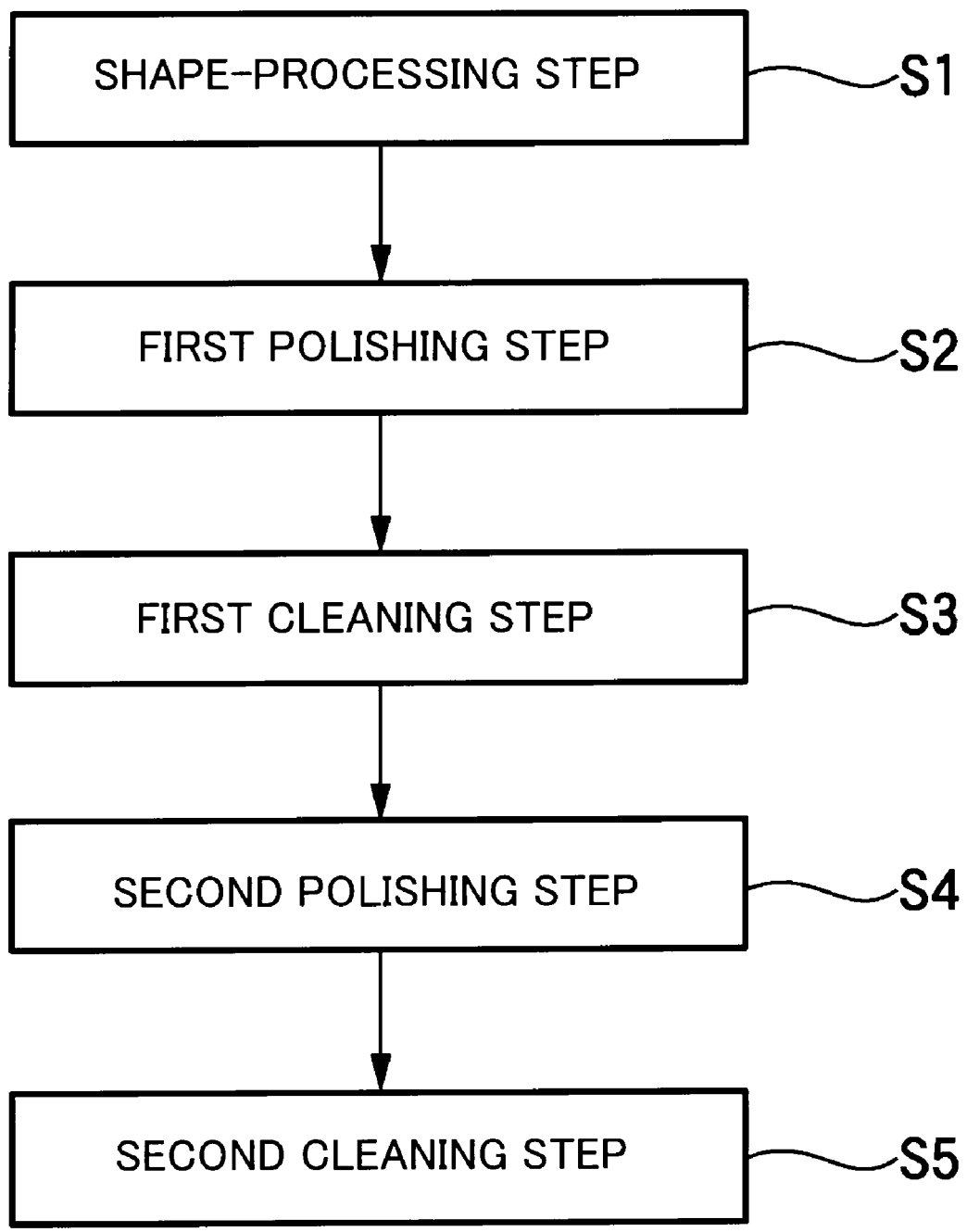
FIG. 1 is a flow chart showing a process according to the invention for producing a glass substrate for magnetic disk.

Embodiments of the invention are described below in detail by reference to accompanying drawings. The method for glass substrate polishing of the invention and the process for glass substrate production of the invention are applicable to various glass substrates to be processed with a polishing machine, such as color filter substrates, photomask substrates, and glass substrates for thin-screen TVs. However, the polishing method and production process are especially suitable for use in producing a glass substrate for electronic device which is required to have high precision and high quality. In the following embodiment, a glass substrate for magnetic disk is produced as an example of the glass substrate for electronic device.

A process for producing glass substrates for magnetic disk 10 (hereinafter often referred to simply as glass substrates) is explained by reference to FIG. 1. This process for producing glass substrates 10 generally includes a shape-processing step, a polishing step, and a cleaning step. In the case where there are two polishing steps, the following process is typical. Namely, the process for glass substrate production including two polishing steps typically has:

(1) a shape-processing step (S1);
(2) a first polishing step (S2);
(3) a first cleaning step (S3);
(4) a second polishing step (S4); and
(5) a second cleaning step (S5).

The shape-processing step (S1) is a step of preparing a circular glass substrate 10 (for example, a glass substrate having a diameter of 65 mm, and comprises a cutting-out step of forming a through-hole (inner hole) at a center of a rectangular sheet glass to process to a circular glass, a chamfering step of subjecting edges (the line of intersection of a main surface and an inner peripheral end surface forming the through-hole and an intersecting point of the main surface and an outer peripheral end surface) of the circular glass cut out to chamfering treatment, a step of polishing an inner periphery and an outer periphery to a mirror surface, and a grinding step of adjusting the thickness of the glass substrate to 110% or less of the thickness of a final product (to 699 µm or less, when the final plate thickness is 635 µm). Incidentally, the main surface means a cyclic part including a front surface and a back surface of the glass substrate 10.

In the first polishing step (S2), the main surface of the glass substrate 10 is subjected to polishing treatment by using a double-sided polishing machine 20 described later, thereby reducing a fine convex-concave shape formed on the main surface of the tabular glass in the shape-processing step (S1) to be able to obtain the mirror-finished main surface.

Specifically, in the first polishing step (S2), polishing is performed using a urethane polishing pad, for example, a rigid urethane foam pad, while supplying a ceria abrasive containing cerium oxide having an average particle size of 0.5 μm to 2.0 μm, in the double-sided polishing machine 20 described later. Incidentally, the decreased amount of the plate thickness decreased (polishing amount) is typically from 20 μm to 65 μm. Like this, the main surface of the glass substrate 10 is polished by the polishing treatment in the first polishing step (S2), and thereafter, polishing treatment in the second polishing step (S4) described later is performed, thereby being able to obtain the mirror-finished main surface for a shorter period of time.

Subsequently, in the first cleaning step (S3), the glass substrate 10 which has finished the first polishing step (S2) is cleaned. For example, ultrasonic cleaning using water, a detergent, a strong acid or a strong alkali is performed.

In the subsequent second polishing step (S4), which is the so-called final polishing, the glass substrates 10 are mounted again in the double-sided polishing machine 20 and the main surfaces thereof are polished so as to result in a desired surface roughness. The main surfaces of the glass substrates 10 are thus mirror-finished. In this embodiment explained here, S4 corresponds to the final polishing step.

Specifically, in the second polishing step (S4), polishing is performed using a urethane polishing pad, for example, a suede pad, while supplying a silica abrasive (abrasive containing silica particles) containing silica particles having an average particle diameter of from 10 nm to 100 nm, in the double-sided polishing machine 20 described later, and the surface roughness (Ra) measured by using an AFM (atomic force microscope) is adjusted, for example, from 0.05 nm to 0.3 nm. Incidentally, the decreased amount of the plate thickness decreased (polishing amount) is typically from 0.3 μm to 3 μm.

The silica abrasive includes silica particles and a dispersion medium (typically, water), and may contain other ingredients according to the necessity.

The silica particles contained in the silica abrasive serve to mechanically polish the glass substrates. The silica particles preferably are colloidal silica or fumed silica. More preferably, the silica particles are colloidal silica. In the case where colloidal silica or fumed silica is used, the surface roughness of the glass substrates is more reduced as compared with the case of using other silica particles. When colloidal silica among these is used, the glass substrates come to have a considerably reduced surface roughness through the polishing.

In case where the silica particles contained in the silica abrasive have an average particle diameter, as determined by the laser diffraction/scattering method, smaller than 5 nm, there is a possibility that polishing efficiency might decrease slightly. Consequently, from the standpoint of preventing polishing efficiency from being reduced by too small an average particle diameter of the silica particles, the average particle diameter of the silica particles is preferably 5 nm or larger, more preferably 10 nm or larger. On the other hand, in case where the silica particles have an average particle diameter larger than 300 nm or when the silica particles have an average particle diameter larger than 200 nm or larger than 100 nm, then there is a possibility that the polishing might result in slightly increased surface roughness or a slightly larger amount of scratches. Consequently, from the standpoint of preventing the glass substrates from being reduced in surface property through the polishing by too large an average particle diameter of the silica particles, the average particle diameter of the silica particles is preferably 300 nm or smaller, more preferably 200 nm or smaller, most preferably 100 nm or smaller.

In case where the content of silica particles in the silica abrasive is lower than 0.1% by mass or when the content thereof is lower than 1% by mass or lower than 3% by mass, then there is a possibility that the polishing of the glass substrates might result in a slight decrease in polishing efficiency or a slight increase in polishing resistance. Consequently, from the standpoint of preventing too low a content of silica particles from resulting in a decrease in polishing efficiency or an increase in polishing resistance, the content of silica particles is preferably 0.1% by mass or higher, more preferably 1% by mass or higher, most preferably 3% by mass or higher. On the other hand, in case where the content of silica particles is higher than 40% by mass or when the content thereof is 30% by mass or higher, there is a possibility that the silica abrasive might have an increased viscosity. As a result, this silica abrasive may be apt to gel or be difficult to handle. Consequently, from the standpoint of preventing the silica abrasive from being increased in viscosity by too high a content of silica particles, the content of silica particles is preferably 40% by mass or lower, more preferably 30% by mass or lower.

In this second polishing step (S4) in this embodiment, a high-boiling solvent represented by glycerine is injected into the double-sided polishing machine 20, which will be described later. The high-boiling solvent may be injected into the polishing machine separately from the abrasive. Usually, however, the high-boiling solvent is mixed with the abrasive and the resultant polishing slurry containing the high-boiling solvent is injected into the polishing machine. Details of step (S4) will be explained later.

Subsequently, in the second cleaning step (S5), the glass substrate 10 which has finished the second polishing step (S4) and thereafter taken out from the double-sided polishing machine 20 are cleaned. For example, ultrasonic cleaning is conducted using water and a detergent, strong acid, or strong alkali.

The process for producing glass substrates for magnetic disk 10 in the invention should not be construed as being limited to the process described above. The production process may be any process so long as it at least includes the final polishing step. The production process may include the step of polishing the inner-periphery end surface and the outer-periphery end surface, or may include the step of additionally polishing the main surfaces.

Figure 2:
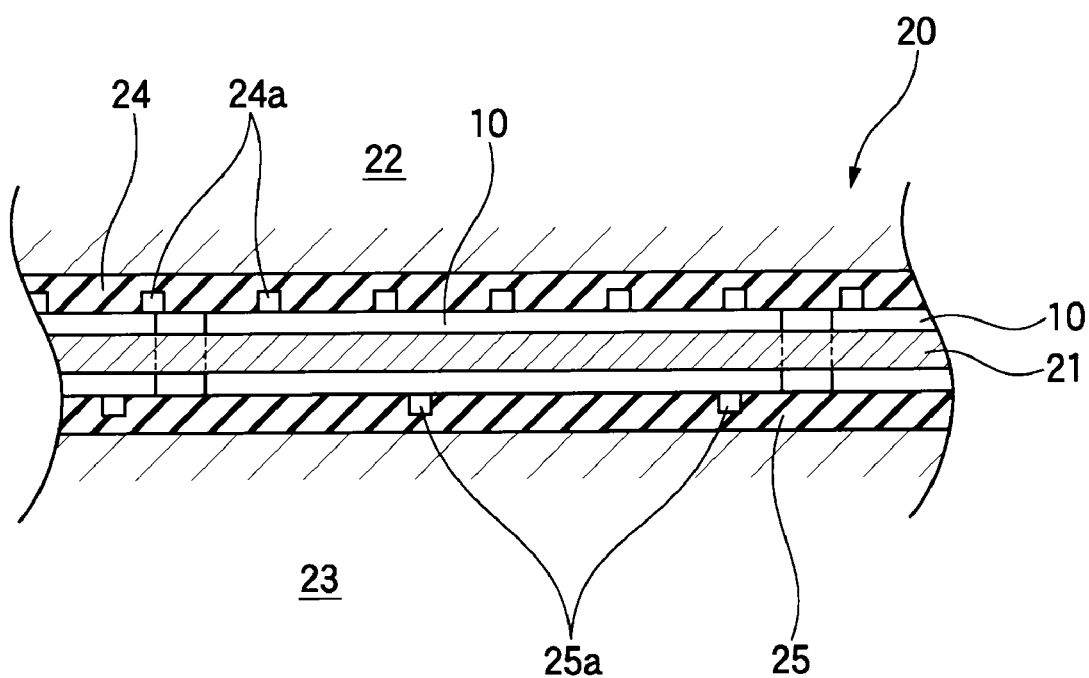
FIG. 2 is a sectional view of a double-sided polishing machine according to the invention for a glass substrate for magnetic disk.

The double-sided polishing machine (glass substrate polishing machine) 20 to be used in the first polishing step (S2) and second polishing step (S4) is explained next. As shown in FIG. 2, the double-sided polishing machine 20 of the invention comprises a carrier 21 for holding the glass substrate 10, and an upper surface plate 22 and a lower surface plate 23 which can be driven for rotation reversely to each other with the glass substrate 10 therebetween. Polishing pads 24 and 25 are each mounted on faces of the upper surface plate 22 and the lower surface plate 23 facing to glass substrates 10.

In order to mount and take out the glass substrate 10 before and after the polishing treatment, the upper surface plate 22 is movable up and down against the lower surface plate 23, and during the polishing, the polishing pads 24 and 25 are constituted so as to be reversely rotatable while being brought into abutting contact with the main surface of the glass substrate 10. Incidentally, like the conventional double-sided polishing machine 100 of FIG. 10, the carrier 21 may be rotated relatively to the upper surface plate 22 and the lower surface plate 23, using the internal gear 101 and the sun gear 102 which are each driven for rotation at a predetermined rotation ratio.

The polishing pad 24 mounted on the upper surface plate 22 and the polishing pad 25 mounted on the lower surface plate 23 each have, formed in the surface thereof, grooves having approximately the same width and disposed at the same interval in a lattice arrangement. Due to this constitution, the abrasive or polishing slurry can be distributed to the whole glass substrates 10 in polishing. It should, however, be noted that grooves need not be always disposed in a lattice arrangement and can be disposed in any desired arrangement. For example, linear or curved grooves may be disposed so as to extend radially from the center of the polishing pad 24 or 25 toward the outer periphery. Alternatively, grooves may be spirally disposed so that the radius-direction length thereof gradually increases from the center toward the outer periphery. Furthermore, the arrangement of grooves in the polishing pad 24 mounted on the upper surface plate 22 need not be always the same as the arrangement of grooves in the polishing pad 25 mounted on the lower surface plate 23.

As the polishing pads 24 and 25, use can be made of polishing pads made of all materials including nonwoven-fabric, velour, and suede-like polishing pads and ones made of fibers or a resinous material or a composite material composed of these, besides the polishing pads described above. However, as polishing pads especially for producing glass substrates for magnetic recording medium which have a surface roughness of about from 0.05 nm to 0.2 nm, it is preferred to use suede-like polishing pads formed from a polymer foam, in particular, a polyurethane foam, and having a compression rate of 0 to 15% and a compressive elasticity modulus of 80 to 99%.

Figure 3:
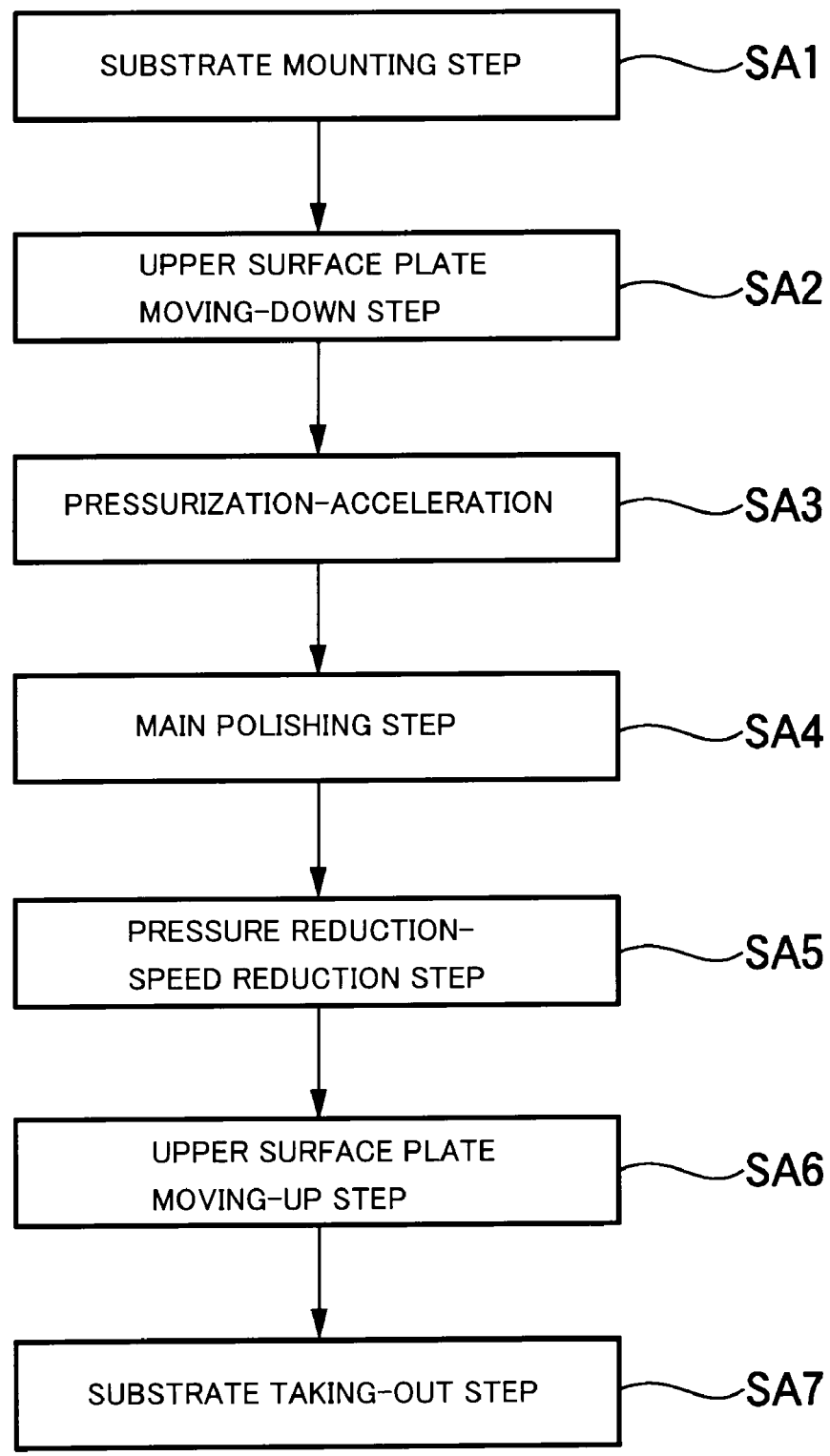
FIG. 3 is a flow chart showing the procedure of treatment with the double-sided polishing machine according to the invention for a glass substrate for magnetic disk.
Figure 4:
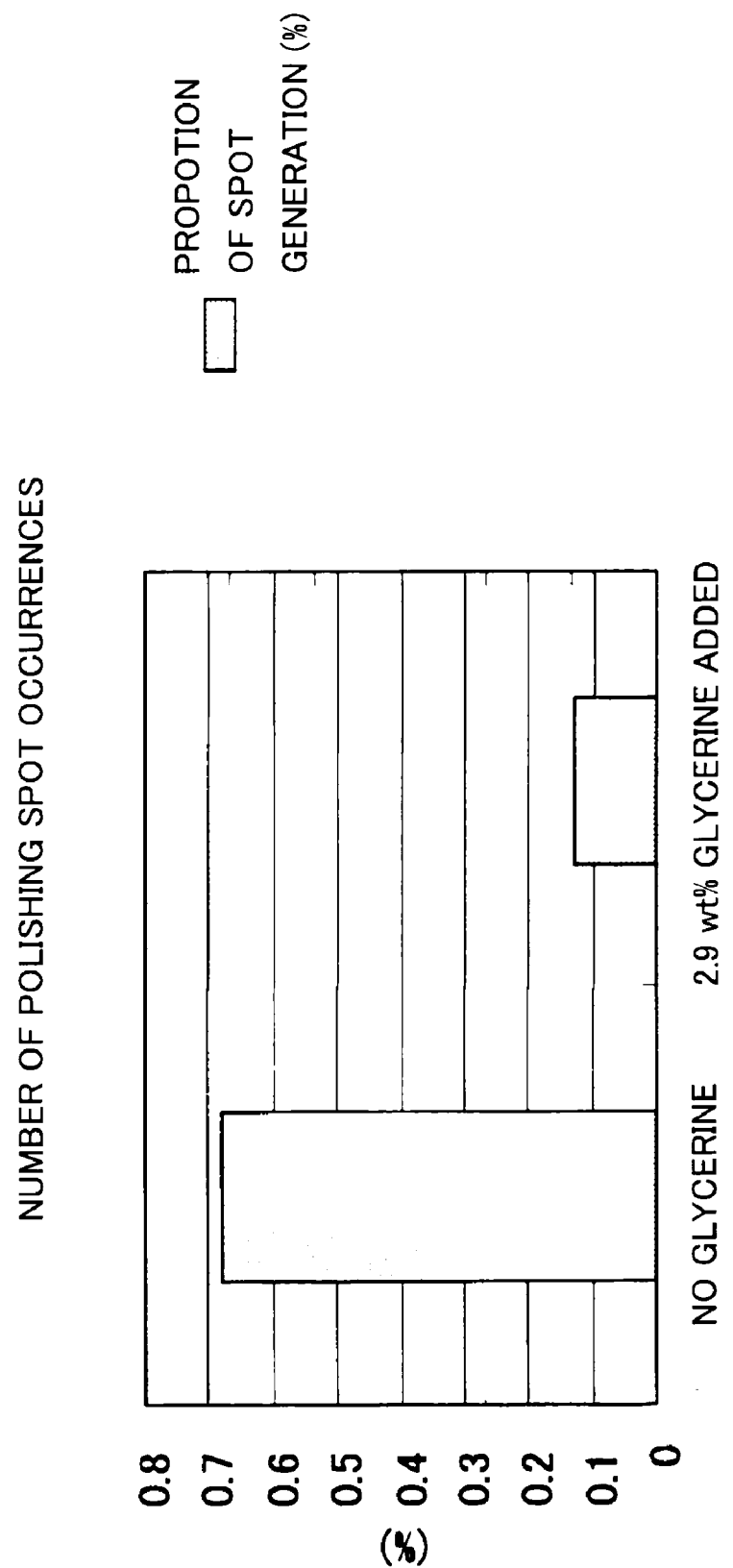
FIG. 4 is a graphic presentation showing an experiment for comparing polishing spot generation on glass substrates.

A typical example of the procedure of treatment (method for polishing) with the double-sided polishing machine 20 is explained below by reference to FIG. 3. As shown in FIG. 3, the procedure of treatment with this double-sided polishing machine 20 has:

(1) a substrate mounting step (SA1);
(2) an upper-surface plate moving-down step (SA2);
(3) a pressurization-acceleration step (SA3);
(4) a main polishing step (SA4);
(5) a pressure reduction-speed reduction step (SA5);
(6) an upper-surface plate moving-up step (SA6); and
(7) a substrate taking-out step (SA7).

First, glass substrates 10 are mounted on the carrier 21 (SA1), and the upper surface plate 22 is moved down (SA2) after the mounting of the glass substrates 10. Subsequently, while supplying an abrasive or both an abrasive and a high-boiling solvent or a polishing slurry prepared by mixing an abrasive with a high-boiling solvent (hereinafter, these are inclusively referred to as "abrasive etc."), the polishing pad 24 of the upper surface plate 22 and the polishing pad 25 of the lower surface plate 23 are brought into contact with the glass substrates 10 and the rotation of the upper surface plate 22 and lower surface plate 23 is initiated and accelerated while pressing the pads 24 and 25 against the glass substrates 10 (SA3). Subsequently, polishing is conducted for a given time period (SA4). Thereafter, the rotational speed of the upper surface plate 22 and lower surface plate 23 is reduced and the pressure is reduced (SA5). After stopping, the upper surface plate is moved-up (SA6) and the glass substrates 10 are taken out from the carrier 21 (SA7).

The treatment procedure described above is conducted in (2) the first polishing step (S2) and (4) the second polishing step (S4) shown in FIG. 1. Each polishing step is performed while supplying the predetermined abrasive etc. to between the polishing pads 24 and 25 of the double-sided polishing machine 20 as described above. In the invention, a high-boiling solvent represented by glycerine is used in the second polishing step (S4) in this embodiment, i.e., used in the final polishing step, and a silica abrasive is used as the abrasive in this step. Specifically, from the beginning of the second polishing step (S4) or from the middle of this step, a high-boiling solvent is injected into between the polishing pads 24 and 25 of the double-sided polishing machine 20 either separately from the abrasive or in the form of a polishing slurry prepared by mixing the solvent with the abrasive.

The high-boiling solvent to be injected as an additive has the effect of preventing the abrasive from drying. This solvent hence prevents the abrasive from vaporizing and drying after completion of the second polishing step (S4), and the time period required for the abrasive to vaporize to dryness can be prolonged as compared with conventional steps. Consequently, the generation of polishing spots (FIG. 11) caused by abrasive drying in the interval between steps before the glass substrates are introduced into the next cleaning step can be reduced.

Figure 11:
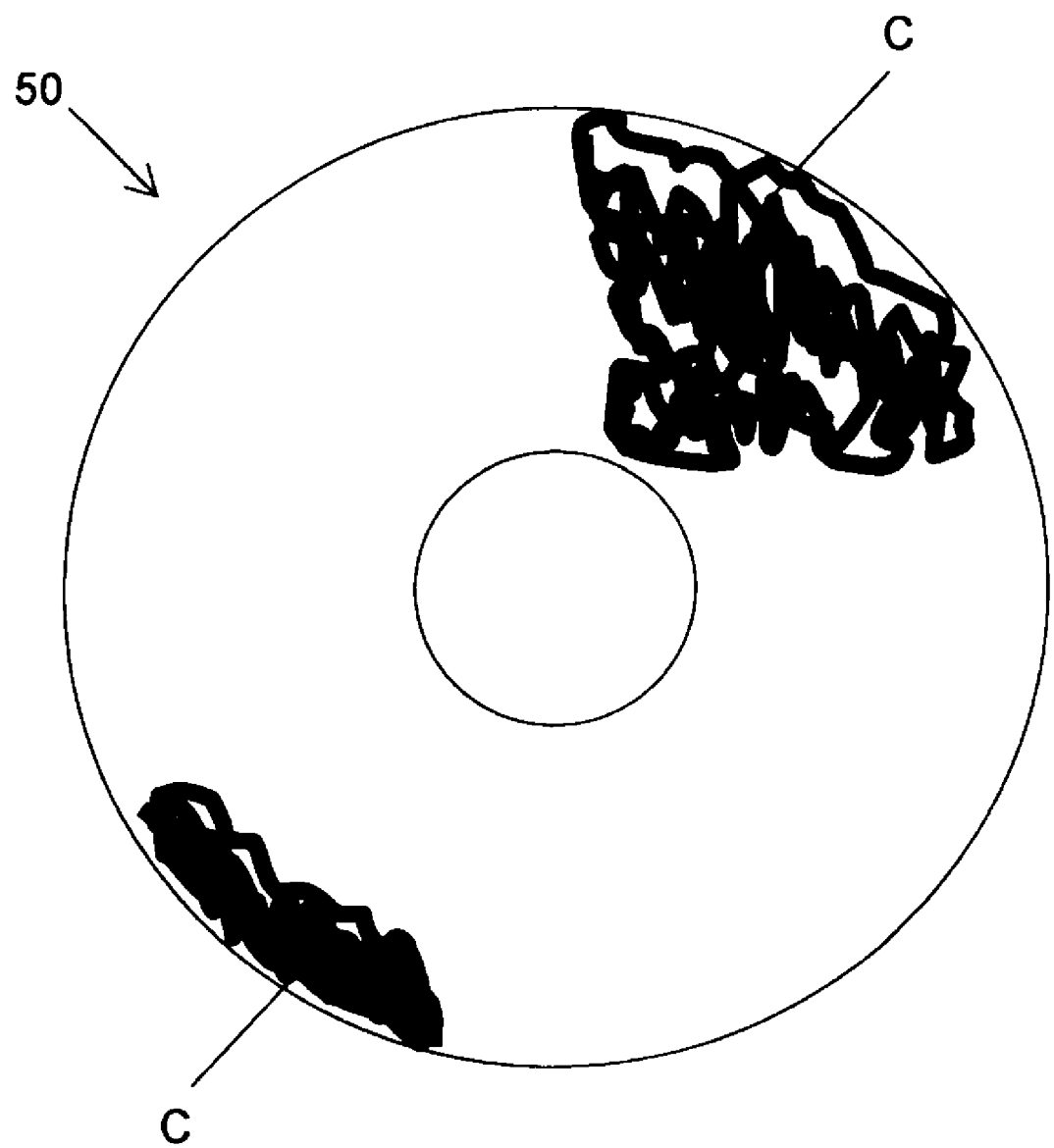
FIG. 11 is a view showing a glass substrate having polishing spots adherent thereto.

The presence of polishing spots such as those shown in FIG. 11 may adversely influence various steps succeeding the polishing step (e.g., the step of removing spots is necessary). There also is a fear that such spots may deteriorate the quality of glass substrates as a final product. According to the invention, the generation of polishing spots, which may exert such adverse influences, is reduced.

The higher the boiling point, the more the high-boiling solvent is effective in inhibiting the spot generation caused by abrasive drying. Consequently, the boiling point thereof is 150° C. or higher, preferably 200° C. or higher, and is typically 350° C. or lower, more typically 320° C. or lower. High-boiling solvents having a higher molecular weight have the effect of forming a thicker liquid film between the substrates and each polishing pad or adhering to the substrates to protect the substrates. There is hence a possibility that such a high-boiling solvent might reduce polishing resistance and lower the efficiency of mechanical polishing. Consequently, the molecular weight thereof is preferably 300 or lower, more preferably 200 or lower, and is typically 50 or higher.

In case where the amount of the high-boiling solvent added (proportion in terms of percent of the mass of the high-boiling solvent to the sum of the mass of the abrasive and the mass of the high-boiling solvent) is smaller than 0.1% by mass, there is a possibility that the effect of preventing drying might be insufficient. Consequently, from the standpoint of obtaining a sufficient drying-preventive effect, the amount of the high-boiling solvent to be added is preferably 0.1% by weight or larger. On the other hand, in case where the amount of the high-boiling solvent added is larger than 20% by weight, the solvent may cause particle aggregation or bring about the danger of catching fire. Consequently, from the standpoints of preventing particle aggregation and preventing the abrasive from having the danger of catching fire, the amount of the high-boiling solvent to be added is preferably 20% by mass or lower. The amount of the high-boiling solvent to be added is more preferably in the range of from 0.1% by mass to 4.0% by mass, and is even more preferably in the range of from 0.5% by mass to 3.0% by mass.

High-boiling solvents containing any of one or more hydroxyl groups, one or more carbonyl groups, one or more ether bonds, and one or more ester bonds have excellent solubility in the water used as a dispersion medium of the abrasive. Examples of high-boiling solvents which contain any one of one or more hydroxyl groups, one or more carbonyl groups, one or more ether bonds, and one or more ester bonds and which have a boiling point of 150° C. or higher and a molecular weight of 300 or lower include 1-hexanol (157, 102), 1-heptanol (176, 116), ethylene glycol (198, 62), propylene glycol (187, 76), 1,3-propanediol (214, 76), 1,4-butanediol (229, 90), 1,5-pentanediol (242, 104), hexylene glycol (197, 118), glycerine (290, 92), diacetone alcohol (168, 116), diethylene glycol (245, 106), diethylene glycol monomethyl ether (194, 120), diethylene glycol monoethyl ether (202, 134), diethylene glycol monobutyl ether (230, 162), triethylene glycol (288, 150), and 2-ethoxyethyl acetate (156, 132). The numerals in the parenthesis following each solvent name are boiling point (unit: ° C.) and molecular weight in order.

It is preferred that the high-boiling solvent should be a solvent containing two or more hydroxyl groups, because this solvent has better solubility in water, is lowly toxic, and does not cause polishing pad dissolution. Examples of solvents containing two or more hydroxyl groups and having a boiling point of 150° C. or higher and a molecular weight of 300 or lower include ethylene glycol, propylene glycol, 1,3-propanediol, 1,4-butanediol, 1,5-pentanediol, hexylene glycol, glycerine, and triethylene glycol. More preferred examples thereof include ethylene glycol, propylene glycol, and glycerine. Ethylene glycol, propylene glycol, and glycerine, when added to silica abrasives, do not inhibit the dispersibility of the particles.

Although the high-boiling solvent can be used in all polishing steps (e.g., the first and second polishing steps), the solvent is used at least in the final polishing step (second polishing step), which is conducted just before the taking-out step.

The invention will be explained below in detail by reference to Examples of the invention and Comparative Examples. The invention should not be construed as being limited to the constitutions of the following Examples.

[Test for Comparing Polishing Spot Generation]

In order to investigate the effect of preventing the generation of polishing spots, a final polishing step was conducted using, in one case, a polishing slurry prepared by adding glycerine as a high-boiling solvent to a silica abrasive containing silica particles which were colloidal silica (colloidal-silica abrasive) or using, in another case, the colloidal-silica abrasive to which no high-boiling solvent had been added, and whether these two cases resulted in a difference in the number of glass substrates having polishing spots was examined. After completion of the final polishing step, the glass substrates were taken out from the polishing machine, allowed to stand for from 1 minute to 10 minutes, and then cleaned with water and a detergent. Thereafter, the number of glass substrates having polishing spots adherent thereto was counted. In the polishing slurry, the amount of the glycerine added was 2.9% by mass based on the mass of the whole abrasive. The other conditions were completely the same in the two cases.

In the case where the colloidal-silica abrasive to which no high-boiling solvent such as glycerine, had been added was used in the final polishing step, 0.68% of the glass substrates suffered polishing spot generation (768 substrates/113,000 substrates). On the other hand, in the case where the polishing slurry containing glycerine was used in the final polishing step, 0.13% of the glass substrates suffered polishing spot generation (16 substrates/12,000 substrates). It was thus ascertained that the frequency of polishing spot generation in the case where glycerine had been incorporated was lower than in the case where glycerine had not been incorporated.

Separately from the comparison test given above, an experiment was made in which the addition of ethylene glycol or propylene glycol, as a glycol solvent, was compared with the case where neither of these solvents was added. Conditions under which addition of no solvent resulted in a frequency of polishing spot generation of 6 substrates/340 substrates were used. As a result, the addition of 1.5% by mass ethylene glycol resulted in a frequency of polishing spot generation of 0 substrate/170 substrates, and the addition of 2.9% by mass ethylene glycol resulted in a frequency of polishing spot generation of 0 substrate/17 substrates. It was ascertained that the addition of the solvent was able to considerably reduce the frequency of spot generation.

Likewise, conditions under which addition of no solvent resulted in a frequency of polishing spot generation of 76 substrates/423 substrates were used to examine the addition of 1.5% by mass propylene glycol. As a result, the resultant frequency was 5 substrates/945 substrates.

It can be seen from the results given above that according to the invention, spot generation on glass substrates which have finished a polishing step can be reduced and the quality of the glass substrates as a final product can be heightened without adversely influencing the steps to be conducted after completion of the polishing.

[Test for Comparing Polishing Mar Generation]

Subsequently, a foreign substance was added to each of a colloidal-silica abrasive and a cerium oxide abrasive, and these abrasives were used to polish glass substrates. The polished glass substrates were examined for the number of resultant damages (polishing damages). In this test, a polishing machine having suede pads was used to conduct polishing at 10 kPa. As the foreign substance, a glass cullet having an average particle diameter of 7 μm was added in an amount of 1,000 mass ppm of each abrasive. The flow rate of each abrasive was 100 cc/min.

Figure 5:
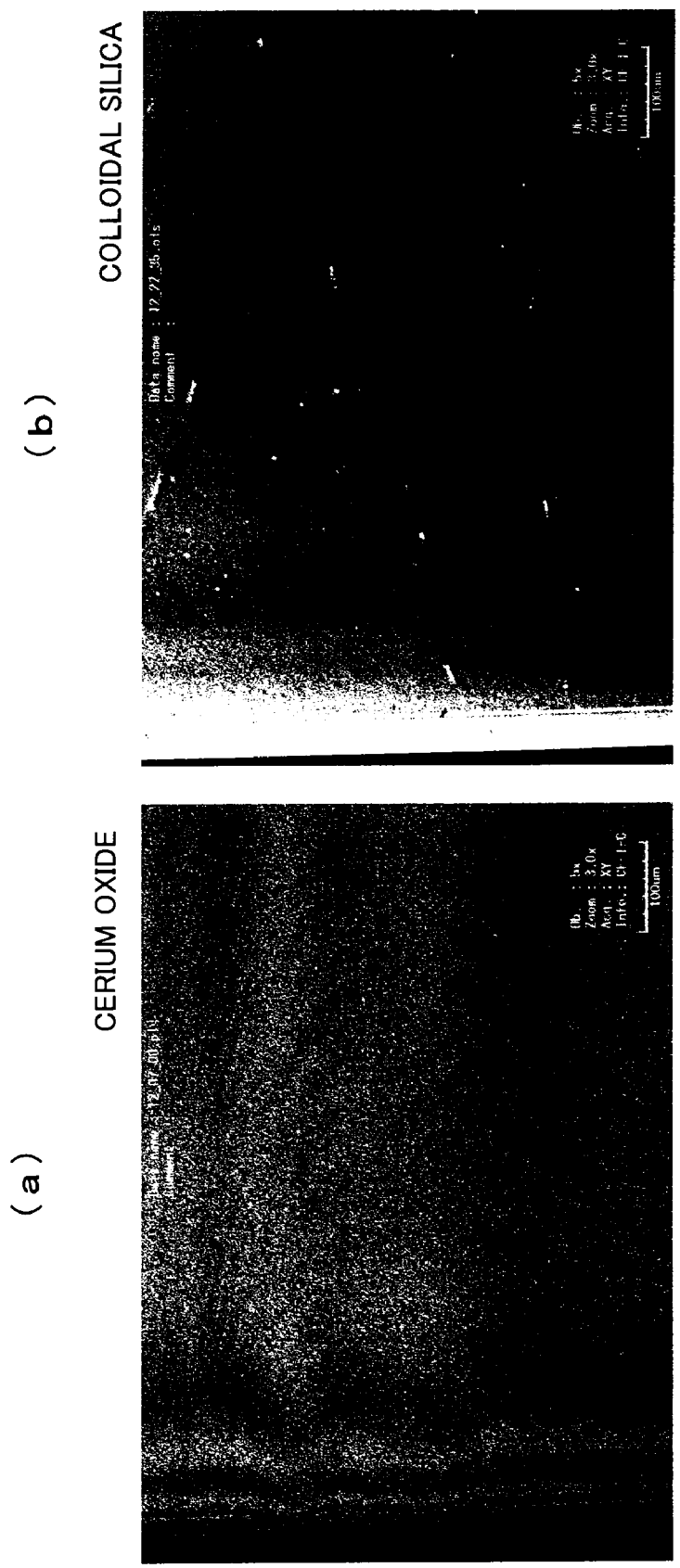
FIG. 5(a) and FIG. 5(b) are photographs of peripheral parts of polished glass substrates obtained using polishing slurries into which a foreign substance has come.

FIGS. 5(a) and (b) show photographs of peripheral parts of substrates polished under those conditions. FIG. 5(a) shows the case where the abrasive was the cerium oxide abrasive, while FIG. 5(b) shows the case where the abrasive was the colloidal-silica abrasive. FIG. 6 shows the frequency of damage generation (number of damages) in each case. It was found from the results of this test that in the case of using the abrasive containing colloidal silica, foreign-substance inclusion is apt to result in damage generation.

A comparison in the frequency of damage generation was then made between the case where glycerine, a high-boiling solvent, was added to a colloidal-silica abrasive and the case where glycerine was not added thereto. The results of this comparison test are shown in FIG. 7. It was found from the results of this test that the addition of given amounts of glycerine inhibits damage generation.

A comparison in frictional resistance was then made between the case where glycerine or ethylene glycol was added to a colloidal-silica abrasive and the case where neither of these was added thereto. The results of this comparison test are shown in FIG. 8. It was found from the results of this test that the addition of a given amount of glycerine or ethylene glycol reduces the coefficient of friction.

Figures 9, 10:
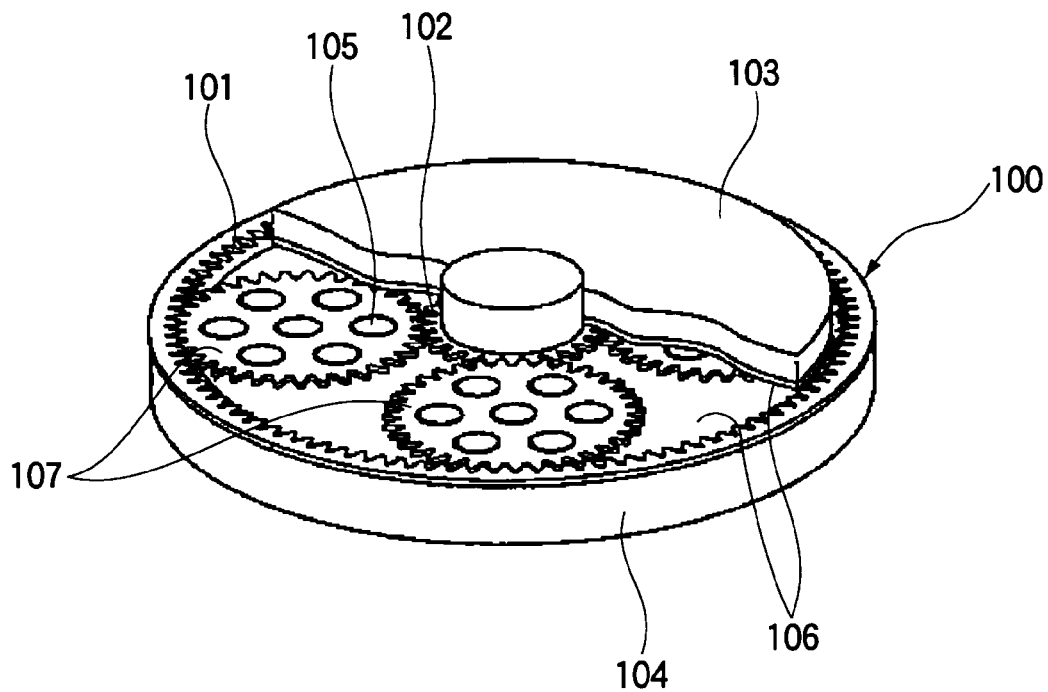
FIG. 9 is a table showing the results of an examination in which glycerine was added to a colloidal-silica-containing abrasive in various concentrations and the polishing rates (polishing efficiencies) corresponding to the respective concentrations were determined.
FIG. 10 illustrates the double-sided polishing machine described in patent document 1.

Furthermore, glycerine was added to a colloidal-silica abrasive in various concentrations, and the polishing rates (polishing efficiencies) corresponding to the respective concentrations were determined. The results of this comparison test are shown in FIG. 9. It was found from the results of this test that the addition of 5% by mass glycerine results in a decrease in polishing rate.

Those results may be summarized as follows. Compared to cerium oxide abrasives, use of colloidal-silica abrasives is more apt to result in mar generation through the polishing step when a foreign substance has come thereinto. However, by using a high-boiling solvent in the final polishing step, the damage generation can be reduced. It is thought that the addition of the solvent reduces the coefficient of friction and enables the foreign substance to be effectively discharged from the polishing pads. Consequently, in the case of using a colloidal-silica abrasive, to add a high-boiling solvent is especially useful because polishing damage generation can be inhibited thereby. It is, however, noted that when the high-boiling solvent is excessively added to the colloidal-silica abrasive, the polishing rate (polishing efficiency) decreases.

To sum up, the amount of the high-boiling solvent to be added is regulated so as to be preferably in the range of from 0.1% by mass to 20% by mass from the standpoint of diminishing polishing spots or polishing damages. The amount of the high-boiling solvent to be added is more preferably in the range of from 0.1% by mass to 4.0% by mass, even more preferably in the range of from 0.5% by mass to 3.0% by mass.

The timing of injecting the high-boiling solvent, the amount of the solvent to be injected, etc. in polishing steps are not particularly limited. By adding the solvent to the abrasive from the beginning of the final polishing step, the polishing step can be simplified. This method was used in the Examples. When the high-boiling solvent is added only to that portion of the abrasive which is to be injected in the last stage of the final polishing step, the amount of the high-boiling solvent to be used can be reduced. Although the invention is suitable for the production of glass substrates for magnetic disks, the kind of glass substrates is not limited to glass substrates for magnetic disks. The invention is especially suitable for the glass substrates for electronic devices which are required to have high precision and high quality.

The invention should not at all be construed as being limited to the embodiments described above, and various modifications can be made therein unless the modifications depart from the spirit of the invention.

This application is based on Japanese Patent Application 2008-174551, filed on Jul. 3, 2008, the contents thereof being herein incorporated by reference.

INDUSTRIAL APPLICABILITY

The invention can heighten the quality of glass substrates as a final product without adversely influencing the steps to be conducted after completion of the polishing. The invention is hence useful for the production of various glass substrates, in particular, the glass substrates for electronic devices which are required to have high precision and high quality, such as glass substrates for magnetic disks.

10 and 50 glass substrate
20 double-sided polishing machine
22 upper surface plate
23 lower surface plate
24 and 25 polishing pad

The invention claimed is:

1. A method for polishing a glass substrate, comprising polishing the glass substrate with a glass substrate polishing machine and:
   injecting a silica abrasive and a high-boiling solvent having a boiling point of 150° C. or higher into the glass substrate polishing machine during final polishing of the glass substrate wherein the high-boiling solvent is in an amount of from 0.1% by mass to 4.0% by mass based on the total mass of the high-boiling solvent and the silica abrasive.

2. The method for polishing a glass substrate according to claim 1, wherein the high-boiling solvent is a solvent having a molecular weight of 300 or lower.

3. The method for polishing a glass substrate according to claim 2, wherein the high-boiling solvent is a solvent comprising one or more of hydroxyl groups, ether bonds, carbonyl groups, and ester bonds.

4. The method for polishing a glass substrate according to claim 3, wherein the high-boiling solvent is a solvent comprising two or more hydroxyl groups.

5. The method for polishing a glass substrate according to claim 1, wherein the high-boiling solvent is in an amount of from 0.5% by mass to 3.0% by mass based on the total mass of the high-boiling solvent and the silica abrasive.

6. A process for producing a glass substrate for a magnetic disk, said process comprising:
   (a) mounting the glass substrate between an upper surface plate and a lower surface plate of a glass substrate polishing machine, wherein each of the plates has a polishing pad;
   (b) carrying out final polishing of both sides of the glass substrate while supplying a silica abrasive and a high-boiling solvent having a boiling point of 150° C. or higher between the polishing pads of the upper surface plate and lower surface plate, after said (a) mounting the glass substrate; and
   (c) taking out the glass substrate disposed between the upper surface plate and the lower surface plate from the glass substrate polishing machine, after said (b) carrying out final polishing of both sides of the glass substrate, wherein the high-boiling solvent is in an amount of from 0.1% by mass to 4.0% by mass based on the total mass of the high-boiling solvent and the silica abrasive.

7. The process for producing a glass substrate for magnetic disk according to claim 6, wherein the silica abrasive has silica particles and the silica particles are colloidal silica.

8. The method according to claim 1, wherein the abrasive silica consists of silica particles wherein the silica particles have an average particle diameter of from 10 nm to 100 nm.

9. The process according to claim 6, wherein the abrasive silica consists of silica particles wherein the silica particles have an average particle diameter of from 10 nm to 100 nm.

* * * * *